US008758908B2

(12) United States Patent
Marshall et al.

(10) Patent No.: US 8,758,908 B2
(45) Date of Patent: Jun. 24, 2014

(54) USE OF MONAZITE OR XENOTIME SOLUTION PRECURSORS TO INCREASE THE DENSITY AND SHEAR STRENGTH OF OXIDE COMPOSITES

(75) Inventors: David B. Marshall, Thousand Oaks, CA (US); Janet B. Davis, Thousand Oaks, CA (US); Peter E. D. Morgan, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 1619 days.

(21) Appl. No.: 12/044,336

(22) Filed: Mar. 7, 2008

(65) Prior Publication Data

US 2014/0065292 A1 Mar. 6, 2014

(51) Int. Cl.
*B32B 9/00* (2006.01)
*B32B 19/00* (2006.01)
*B32B 9/04* (2006.01)

(52) U.S. Cl.
USPC .......... 428/702; 428/697; 428/704; 501/95.2; 501/152

(58) Field of Classification Search
USPC ................. 428/688, 689, 697, 699, 702, 704; 501/95.1, 95.2, 126, 152
See application file for complete search history.

(56) References Cited

U.S. PATENT DOCUMENTS

| 5,514,474 | A | * | 5/1996 | Morgan et al. ................ 428/375 |
| 5,665,463 | A | * | 9/1997 | Morgan et al. ................ 442/103 |
| 5,759,632 | A | * | 6/1998 | Boakye et al. ............. 427/419.2 |
| 6,218,324 | B1 | * | 4/2001 | Goettler .......................... 501/88 |
| 6,716,407 | B2 | | 4/2004 | Davis et al. |
| 6,844,091 | B2 | * | 1/2005 | Denham et al. ............... 428/697 |
| 2009/0280257 | A1 | * | 11/2009 | Morrison ................... 427/376.2 |

FOREIGN PATENT DOCUMENTS

JP 07-291713 7/1995

* cited by examiner

*Primary Examiner* — Noah Wiese
(74) *Attorney, Agent, or Firm* — Glenn H. Lenzen; Husch Blackwell LLP

(57) ABSTRACT

Aqueous precursor solutions are described that comprise at least one monazite-based material precursor, at least one xenotime-based material precursor or a combination thereof; and a plurality of fine suspended particles of an oxide material. Contemplated oxide composites, as described herein, comprise a plurality of fibers surrounded by at least one monazite or xenotime-based material, wherein the oxide composite has nearly a fully dense matrix. Contemplated embodiments disclosed herein provides a method for producing an oxide composite with nearly fully dense matrix and with all fibers surrounded by a monazite- or xenotime-based material that prevents embrittlement at temperatures at least as high as 1200° C. Oxide composites are described that contain a plurality of fibers, a matrix containing at least one or more oxide materials, and at least one monazite-based material, xenotime-based material or combination thereof, wherein the monazite-based or xenotime-based material is formed from the aqueous precursor solutions disclosed herein. Contemplated methods of production include: a) providing a composite comprising oxide-reinforcing fibers and a porous matrix of oxide materials, and b) infiltrating the porosity in the matrix with a solution that contains precursors for at least one monazite-based material, at least one xenotime-based material or a combination thereof; and c) heat treating the composite to convert the precursors to monazite, xenotime, or combinations thereof.

17 Claims, 2 Drawing Sheets

USE OF MONAZITE OR XENOTIME SOLUTION PRECURSORS TO INCREASE THE DENSITY AND SHEAR STRENGTH OF OXIDE COMPOSITES

FIELD OF THE SUBJECT MATTER

The present application relates to fiber-reinforced ceramic composites, specifically, those composites comprising a plurality of oxide fibers or an oxide fibrous structure, an oxide matrix and at least one monazite or xenotime compound or composition.

BACKGROUND

Ceramic composites consist of ceramic fibers (usually in the range 10 to 20 μm diameter and often woven into fabrics) and a matrix which is also ceramic. When made correctly they are strong, tough materials that can be used in a wide range of high temperature structural components, including engines (power generation turbines, aircraft engines, rocket engines, hypersonic engines), hot airframe structures, and thermal protection systems.

The choice of materials for the fibers and matrix is usually driven by the high temperature chemical environment of the application and lifetime requirements. For short lifetimes and very high temperatures, carbon or SiC are generally chosen. For long lifetimes in oxidizing environments, oxide materials are generally chosen since they are thermodynamically stable in the environment.

An important feature required in order to make a tough ceramic composite is some mechanism for decoupling or segregating damage in the matrix and fibers. Without this ability to control and mitigate damage within the matrix and fibers, cracks grow directly from matrix to fibers and the composite is brittle. In oxide composites, two methods have been used to decouple fiber and matrix fracture: a) use of a matrix material with sufficiently low strength that damage is unable to propagate from the matrix to the fibers, and b) use of a material in the matrix (or as a coating on the fibers), which does not bond strongly to the fibers.

With respect to the first method—the use of a matrix material with sufficiently low strength that damage is unable to propagate from the matrix to the fibers—a sufficiently low strength is usually achieved by using a matrix that contains a significant level of porosity, either distributed throughout the matrix, or concentrated in a porous layer around individual fibers. This type of composite is analogous to a starched fabric. For this mechanism to be successful, the volume fraction of porosity in the matrix must be larger than a specified critical value.

With respect to the second method—the use of a material in the matrix (or as a coating on the fibers), which does not bond strongly to the fibers—the matrix itself can have high strength, while the weak interface between the fibers and matrix prevents propagation of damage from the matrix to the fibers, as needed for high toughness. The strength of a matrix can be made high by minimizing the volume fraction of porosity. A well-defined criterion exists for the upper limit on the bond strength between the fiber and matrix (or coating) for this method to succeed in providing toughness and damage tolerance in the composite.

The second method listed is generally preferred. A high matrix strength is beneficial in composites formed by laminating layers of reinforcing fibers (which may be in the form of woven fabrics, layers of aligned fibers, or mats of fibers) since the interlaminar strength of the composite is provided solely by the matrix. Composites with porous weak matrices have high strength and toughness when loaded in the direction of the fibers but low interlaminar strengths, whereas composites with dense strong matrices can have high interlaminar strengths. A low volume fraction of porosity in the matrix is also beneficial in preventing the ingress of reactive or damaging liquids and gases into the composite during use.

It is generally difficult to produce ceramic composites with a fully dense matrix. The reason for this difficulty is that most dense ceramics are formed by sintering of powders, a process that involves shrinkage; and when the ceramic is surrounded by rigid fibers, as in the matrix of a composite, the shrinkage needed for densification is prevented by the constraint of the fibers. However, a method to achieve a dense matrix would give considerable benefit, as described above.

Dense matrices can be formed in ceramic composites containing non-oxide reinforcing fibers by infiltrating the matrix material in a molten form. An example is the infiltration of molten silicon into fiber preforms of carbon or silicon carbide. However, this approach is not useful for composites containing oxide fibers, because all available oxide fibers that are suitable for production of composites are degraded by creep and grain growth at the high temperatures needed to melt the matrix materials that are of interest.

Attempts in the literature to produce oxide composites with dense matrices have started with porous-matrix composites, which can be fabricated by several methods, all giving volume fractions of porosity above approximately 50% in the matrix. Two methods have been used to reduce this porosity and thus strengthen the matrix. The first is by application of pressure to the composite at high temperature (this being a common method for densifying monolithic ceramic materials). However, with all available oxide fibers that are suitable for production of composites, degradation of the fibers by creep and grain growth occurs, and therefore, limits the usefulness of this approach.

The second method involves infiltrating the porous-matrix composite at low temperature with a liquid precursor that forms the desired matrix material after being heated at a higher temperature. An example is the infiltration of an aqueous solution of aluminum oxychloride into a porous matrix of $Al_2O_3$, followed by heat treatment in air to temperatures above 1000° C. (See Levi C G, Zok F W, Yang J Y, Mattoni M, Lofvander J P A: Microstructural design of stable porous matrices for all-oxide ceramic composites. *Zeitschrift fur metallkunde* 1999, 90: 1037-1047). During the heat treatment, the aluminum oxychloride decomposes to form $Al_2O_3$. Since the decomposition is accompanied by volume shrinkage, multiple cycles of infiltration and heat treatment are needed to eliminate porosity completely. Although this method can densify the matrix successfully, all previous attempts in the literature have produced matrices strongly bonded to the fibers with resulting embrittlement and reduction in strength of the composite.

The only materials known to serve the purpose of bonding weakly to oxide fibers, while possessing other properties required for use in high temperature composites (high melting point, chemical compatibility with other oxides), are rare-earth phosphates (monazite and xenotime). (See Morgan, P. E. D. and Marshall, D. B., "Ceramic Composites having a Weak Bond Material Selected from Monazites and Xenotimes", U.S. Pat. No. 5,514,474 (1996). [Europe, France and UK: #0677497, Germany: #P69506304, Japan: #2901895]; Morgan, P. E. D. and Marshall, D. B., "Fibrous Composites including Monazites and Xenotimes" continuation in part, U.S. Pat. No. 5,665,463 (1997); Davis, J. B., Marshall, D. B., Oka, K. S., and Morgan, P. E. D., "Monazite-based Blanket Coatings for Thermal Protection Systems" U.S. Pat. No. 6,716,407 (2004), which are all incorporated herein by reference in their entirety.) Monazites are a family of phosphates having the general formula $MPO_4$ (MP), where M is selected from the larger trivalent rare earth elements of the lanthanide series, such as lanthanum (La), cerium (Ce), neodymium (Nd), promethium (Pm), samarium (Sm), europium (Eu), gadolinium (Gd), terbium (Tb) or combinations thereof and coupled substituted divalents and tetravalents such as calcium or strontium with thorium. Xenotimes are phosphates similar to monazite, where M is selected from Sc, Y, and the smaller trivalent rare-earth elements of the lanthanide series (e.g., including dysprosium (Dy), holmium (Ho), erbium (Er), thulium (Tm), ytterbium (Yb), lutetium (Lu) or combinations thereof.

Therefore, it would be ideal to produce ceramic-matrix composites in which the fibers are surrounded by monazite or zenotime material and in which the matrix is produced with a method that meets at least one of the following goals: a) produces a dense matrix, b) produces a higher interlaminar strength as compared with conventional porous matrix composites, c) can be easily tailored to provide varying degrees of strength and matrix properties, d) can be formed by strengthening conventional oxide composite materials and e) maintains significant toughness for in-plane loading.

SUMMARY OF THE SUBJECT MATTER

Aqueous precursor solutions are described that comprise at least one monazite-based material precursor, at least one xenotime-based material precursor or a combination thereof; and a plurality of fine suspended particles of an oxide material. Contemplated oxide composites, as described herein, comprise a plurality of fibers surrounded by at least one monazite or xenotime-based material, wherein the oxide composite has nearly a fully dense matrix.

Contemplated embodiments disclosed herein provides a method for producing an oxide composite with nearly fully dense matrix and with all fibers surrounded by a monazite- or xenotime-based material that prevents embrittlement at temperatures at least as high as 1200° C.

Oxide composites are also described that contain a plurality of fibers, a matrix containing at least one or more oxide materials, and at least one monazite-based material, xenotime-based material or combination thereof, wherein the monazite-based or xenotime-based material is formed from the aqueous precursor solutions disclosed herein.

Contemplated methods of production include: a) providing a composite comprising oxide-reinforcing fibers and a porous matrix of oxide materials, and b) infiltrating the porosity in the matrix with a solution that contains precursors for at least one monazite-based material, at least one xenotime-based material or a combination thereof; and c) heat treating the composite to convert the precursors to monazite, xenotime, or combinations thereof.

DETAILED DESCRIPTION

Figure 1:
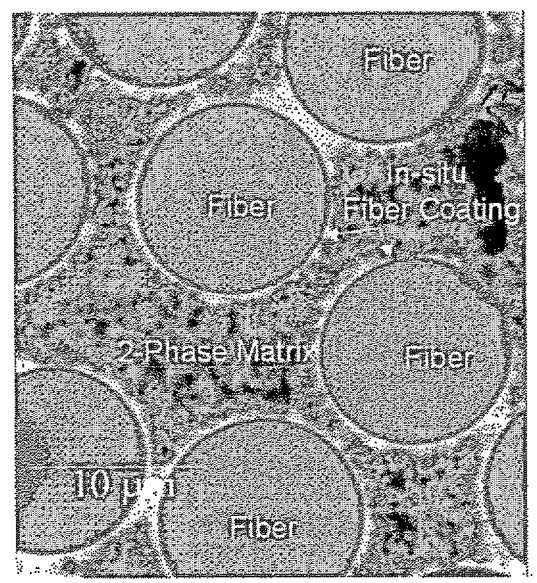
FIG. 1 shows a depiction of a contemplated embodiment.

Ceramic-matrix composites with oxide fibers and matrices have recently been produced that meet at least one of the following goals: a) a dense matrix, b) a higher interlaminar strength as compared with conventional porous matrix composites, c) a method of manufacture or production that can be easily tailored to provide varying degrees of strength and matrix properties, and e) significant strength for loading parallel and normal to the fiber reinforcement direction.

Aqueous precursor solutions are described that comprise at least one monazite-based material precursor, at least one xenotime-based material precursor or a combination thereof; and a plurality of fine suspended particles of an oxide material.

Contemplated oxide composites, as described herein, comprise a plurality of fibers surrounded by at least one monazite or xenotime-based material, wherein the oxide composite has nearly a fully dense matrix. Contemplated embodiments disclosed herein provide a method for producing an oxide composite with nearly fully dense matrix and with all fibers surrounded by a monazite- or xenotime-based material that prevents embrittlement at temperatures at least as high as 1200° C.

Oxide composites are also described that contain a plurality of fibers, a matrix containing at least one or more oxide materials, and at least one monazite-based material, xenotime-based material or combination thereof, wherein the monazite-based or xenotime-based material is formed from the aqueous precursor solutions disclosed herein.

Monazites are a family of phosphates having the general formula $MPO_4$ (MP), where M is selected from the larger trivalent rare earth elements of the lanthanide series, such as lanthanum (La), cerium (Ce), neodymium (Nd), promethium (Pm), samarium (Sm), europium (Eu), gadolinium (Gd), terbium (Tb) or combinations thereof and coupled substituted divalents and tetravalents such as calcium or strontium with thorium. Xenotimes are phosphates similar to monazite, where M is selected from Sc, Y, and the smaller trivalent rare-earth elements of the lanthanide series (e.g., including dysprosium (Dy), holmium (Ho), erbium (Er), thulium (Tm), ytterbium (Yb), lutetium (Lu) or combinations thereof. In some embodiments, the monazite compound comprises lanthanum, cerium, neodymium or a combination thereof. In other embodiments, the monazite compound is $LaPO_4$.

Contemplated methods of production include: a) providing a composite comprising oxide-reinforcing fibers and a porous matrix of oxide materials, and b) infiltrating the porosity in the matrix with a solution that contains precursors for at least one monazite-based material, at least one xenotime-based material or a combination thereof. In some embodiments, the precursors are designed to ultimately produce $LaPO_4$.

Contemplated methods of production include: a) providing a composite comprising oxide-reinforcing fibers and a porous matrix of oxide materials, and b) infiltrating the porosity in the matrix with a solution that contains precursors for at least one monazite-based material, at least one xenotime-based material or a combination thereof; and c) heat treating the composite to convert the precursors to monazite, xenotime, or combinations thereof.

Contemplated precursor solutions may also contain a plurality of fine suspended particles of an oxide material, such as aluminum oxide, another oxide material or a combination of oxide materials. Upon drying and heating the composite, precipitates of crystalline monazite-based materials, xenotime-based materials or a combination thereof form from the solution within the porous matrix. In the $LaPO_4$ example, crystalline $LaPO_4$ forms from the solution within the porous matrix.

The process can be repeated several times, thereby progressively reducing the amount of porosity in the matrix. This process leaves a multi-phase matrix comprising precipitates of crystalline monazite-based materials, xenotime-based materials or a combination thereof and the original oxide materials of the matrix.

Figure 2:
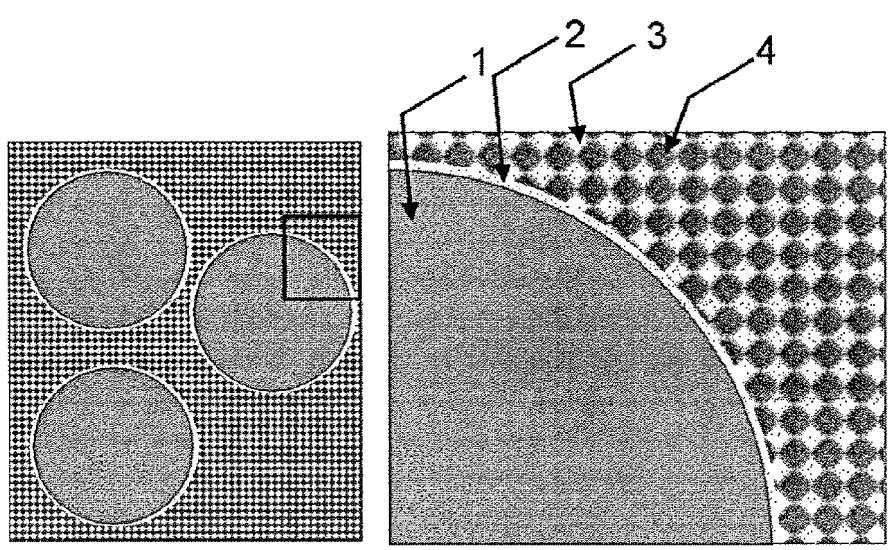
FIG. 2 shows a schematic of a contemplated embodiment.

Surprisingly, a key unexpected observation, is that in this process, the crystalline monazite-based materials, xenotime-based materials or a combination thereof, such as $LaPO_4$, can form a continuous phase or dense matrix around the fibers, as required for debonding and damage tolerance (see FIG. 1 and FIG. 2). In FIG. 1, a dense matrix 110 is shown surrounding the fibers 120. In FIG. 2 a small cross-section, 201, of a larger material, 200 is shown; 1=oxide fiber, 2=RE phosphate layer between the fiber and the matrix, 3=rare earth phosphate in matrix, and 4=oxide phase in matrix.

Dense-matrix composites have been produced in this manner using several types of porous composites as starting materials, some produced in our laboratories and others purchased commercially, where the starting materials comprise alumina or mullite fibers and matrices of alumina or mixtures of alumina and silica. The dense-matrix composites had significantly higher interlaminar strengths than the porous-matrix composites. The dense-matrix composites also maintained high toughness under loading parallel to the fibers.

The chemistry of the monazite-based precursor solutions, xenotime-based precursor solutions and combinations thereof should be controlled in order to produce high-strength composites. For example, certain precursors for monazite are known to cause loss of strength in oxide fibers when exposed to high temperatures. (See: Boakye E, Hay I R S, Petry M D: Continuous Coating Of Oxide Fiber Tows Using Liquid Precursors: Monazite Coatings On Nextel 720. *J. Amer. Cer. Soc.* 1999, 82: 2321-2331)

In contemplated embodiments, aqueous or non-aqueous precursors for monazite or xenotime may be used. Aqueous monazite precursor solutions contain rare earth (RE)-nitrates, acetates or other water-soluble species and one of several sources of phosphorus, including phosphorous acid, phytic acid, methylphosphonic acid or combinations thereof. The combination of a RE-nitrate and phosphorous acid is particularly well suited for composite infiltration, as it has a low viscosity and is stable against precipitation at concentrations of at least as high as 1M. The stoichiometry (RE:P ratio) in all cases can be adjusted to a favorable range to maximize fiber strength retention.

The presence of excess RE or P in a precursor is most easily detected by heat-treating a sample of the precursor to form solid RE phosphate powder, mixing the resulting powder with sapphire (aluminum oxide), and heat-treating the mixture at a temperature of at least 1400° C. in air. The sapphire pieces can then be examined by scanning electron microscopy for evidence of reaction with either excess RE or P.

Further characterization of the precursor solutions typically involves determining whether the solutions cause any strength loss in oxide fibers that would be used as reinforcements in composites (e.g. Nextel 610, Nextel 720 or similar), which can be done by applying the precursor solutions as coatings on the fibers, heat treating the coated fibers at a temperature of at least 1100° C. and then measuring the tensile strengths of the fibers. These measurements are compared to those obtained with bare fibers of the same type heat treated in the same way to determine whether the precursor solution causes any strength loss

EXAMPLES

Example 1

A set of aqueous precursor solutions were produced consisting of La-nitrate and phosphorous acid with concentrations close to 1M, but with different values for the ratio of concentrations of La:P in the range 1:1+/−2000 ppm. A second set of precursor solutions were prepared with the same set of La and P concentrations and with the addition of particles of aluminum oxide of diameter approximately 200 nm suspended in the solutions in a concentration adjusted so that the ratio of aluminum oxide to $LaPO_4$ after drying and heat treatment was 1:10. Samples of commercial fibers of aluminum oxide (Nextel 610, 3M company) were coated with these solution precursors alone, or with the mixtures of the precursor and aluminum oxide particles, then heat treated at 1200° C. in air. A separate set of fiber samples in the as-received state were heat treated in the same conditions for a control measurement.

The fiber strengths were measured after the heat treatment. The strengths of the fibers that had been coated with the precursor solutions were all about 30% lower than the strengths of the control (uncoated) samples, with the strengths of the fibers coated with P-rich precursor being slightly higher than those coated with stoichiometric and La-rich precursors. This range of strengths would permit formation of a useful oxide composite. However, significant improvement was found for the fibers that had been coated with precursor solutions containing suspended aluminum oxide powders: in these cases the strengths were the same as the strengths of the uncoated control samples.

Example 2

The same sample preparation and measurements as in Example 1 were carried out using precursor solutions consisting of La-nitrate and phytic acid. Similar results were found for the fiber strengths.

Example 3

An oxide composite plate consisting of aluminum oxide fibers (3M company) and a porous matrix containing particles of aluminum oxide and $LaPO_4$, was infiltrated with a $LaPO_4$ precursor solution consisting of La-nitrate and phosphorous acid, prepared as in Example 1. The composite plate, which had thickness of approximately 3 mm was cut into test samples. The infiltration was done by immersing the samples in the solution and placing in a vacuum chamber for 30 minutes. The samples were then dried and heat treated at 1200° C. in air for 1 hour. In some test samples the infiltration and heat-treatment procedure was repeated a second and third time. Some of the test samples were sectioned for microstructural analysis and others were used for measurement of mechanical properties.

The microstructures of the infiltrated composites are shown in FIG. 1, which was previously described, in which the white phase is monazite and the grey phase is alumina. The monazite forms a continuous coating around all of the fibers, and is also distributed throughout the matrix in regions that were originally void space between the alumina particles. Both the interlaminar shear properties (SBS test) as well as tensile strength were measured as a function of the number of infiltration cycles. The tensile strength was found to decrease with increasing number of infiltration cycles while the interlaminar shear strength increased. The number of infiltration cycles that provided the best combination of properties was three. In this case the tensile strength was reduced by 10% and the interlaminar shear strength was increased by 150% compared with the original porous-matrix composite, Example 4

An oxide composite with a porous matrix was fabricated using a pressure filtration method. Layers of commercially available aluminum oxide fibers (Nextel 610, 3M company) were stacked in a tool that contained a filtering system, space for introducing a slurry, and a system for applying pressure using a gas. A slurry of commercially available aluminum oxide particles (Sumitomo company) was placed into the tool and the particles were forced into the spaces between the fibers by pressure filtration. The composite thus formed was dried and heat treated in air at 1000° C., a temperature that is high enough for the alumina particles to begin to bond with touching neighbors and form a matrix with low strength, but not high enough for sintering shrinkage to occur. The composite was then cut into test samples. The test samples were infiltrated with a $LaPO_4$ precursor solution consisting of La-nitrate and phosphorous acid, as in Example 3.

The microstructures of the infiltrated composites are similar to FIG. 1. The monazite forms a continuous coating around all of the fibers, and is also distributed throughout the matrix in regions that were originally void space between the alumina particles. Both the interlaminar shear properties (SBS test) and tensile strength were measured as a function of the number of infiltration cycles. The tensile strength was found to decrease with increasing number of infiltration cycles while the interlaminar shear strength increased.

Example 5

A commercially available oxide composite (from COIC company) consisting of alumina fibers (Nextel 610) in a porous matrix containing aluminum oxide was infiltrated with $LaPO_4$ precursor solution using the same procedure as described in Example 3.

The microstructures of the infiltrated composites are similar to FIG. 1. The monazite forms a continuous coating around all of the fibers, and is also distributed throughout the matrix in regions that were originally void space between the alumina particles. Both the interlaminar shear properties (SBS test) and tensile strength were measured as a function of the number of infiltration cycles. The tensile strength was found to decrease with increasing number of infiltration cycles while the interlaminar shear strength increased. The number of infiltration cycles that provided the preferred combination of properties was one. In this case the tensile strength was reduced by 10% and the interlaminar shear strength was increased by 25% compared with the original porous-matrix composite.

Thus, specific embodiments and applications of ceramic composites, their production and uses thereof have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A method of forming an oxide composite comprising:
providing a composite comprising oxide-reinforcing fibers and a porous matrix of oxide materials,
applying as coatings on the fibers precursors for at least one monazite-based material, at least one xenotime-based material or a combination thereof,
infiltrating the porosity in the matrix with a solution that contains the precursors,
filling void space in the matrix with the precursors, and
heat treating the composite to convert the precursors and fill void space with monazite, xenotime, or combinations thereof.

2. The method of claim 1, wherein the monazite-based material comprises $LaPO_4$.

3. The method of claim 1, wherein the solution comprises ions, complexes or combinations thereof.

4. The method of claim 3, wherein the ions, complexes or combinations thereof combine to form rare earth phosphates in solution.

5. The method of claim 4, wherein the rare earth phosphates are formed by evaporation, decomposition, fluid exchange or a combination thereof.

6. The method of claim 5, wherein the rare earth phosphates are further formed by heat treatment.

7. The method of claim 1, further comprising providing a plurality of suspended particles in the solution.

8. The method of claim 7, wherein at least part of the plurality of suspended particles comprise aluminum oxide.

9. The method of claim 6, wherein the steps of infiltrating and forming by heat treatment are repeated until a desired matrix density is reached.

10. The method of claim 1, wherein the precursors are aqueous.

11. The method of claim 10, wherein the precursors for at least one monazite-based material include rare earth nitrates and a source of phosphorous.

12. The method of claim 11, wherein the source of phosphorous includes phosphorous acid, phytic acid, methylphosphonic acid or combinations thereof.

13. The method of claim 11, further comprising
detecting for excess rare earth nitrates or phosphorous by heat-treating a sample of the precursors to form solid rare earth phosphate powder,
mixing the powder with sapphire to form sapphire pieces, and
heat-treating the mixture at a temperature of at least 1400° C. in air.

14. The method of claim 13, further comprising
scanning the sapphire pieces with electron microscopy for evidence of reaction with excess RE or P.

15. The method of claim 1 wherein said coatings comprise monazite, a xenotime, or a combination therefore.

16. The method of claim 1 comprising the step of filling voids in the composite with monazite, at xenotime, or a combination therefore.

17. A method of forming an oxide composite comprising:
providing a composite comprising oxide-reinforcing fibers and a porous matrix of oxide materials,
infiltrating the porosity in the matrix with a solution that contains aqueous precursors for at least one monazite-based material, at least one xenotime-based material or a combination thereof,
applying the precursors as coatings on the fibers,
filling void space in the matrix with the precursors,
heat treating the composite to convert the precursors and fill void space with monazite, xenotime, or combinations thereof,
wherein the precursors for at least one monazite-based material include rare earth nitrates and a source of phosphorous, and
detecting for excess rare earth nitrates or phosphorous by heat-treating a sample of the precursors to form solid rare earth phosphate powder by mixing the powder with sapphire to form sapphire pieces,
heat-treating the mixture at a temperature of at least 1400° C. in air, and
scanning the sapphire pieces with electron microscopy for evidence of reaction with excess RE or P.

* * * * *

UNITED STATES PATENT AND TRADEMARK OFFICE
CERTIFICATE OF CORRECTION

| | |
|---|---|
| PATENT NO. | : 8,758,908 B2 |
| APPLICATION NO. | : 12/044336 |
| DATED | : June 24, 2014 |
| INVENTOR(S) | : David B. Marshall, Janet B. Davis and Peter D. Morgan |

It is certified that error appears in the above-identified patent and that said Letters Patent is hereby corrected as shown below:

Col. 1, Line 13 of Specification, add:

STATEMENT OF GOVERNMENT RIGHTS

This invention was made with Government support under contract number F33615-02-C-5220 awarded by the United States Air Force, Air Force Research Laboratory. The Government has certain rights in the invention.

Signed and Sealed this
Sixteenth Day of September, 2014

Michelle K. Lee
*Deputy Director of the United States Patent and Trademark Office*